US007003496B2

(12) United States Patent
Ishii et al.

(10) Patent No.: US 7,003,496 B2
(45) Date of Patent: Feb. 21, 2006

(54) TERMINAL APPARATUS, INFORMATION SERVICE CENTER, TRANSMITTING SYSTEM, AND TRANSMITTING METHOD

(75) Inventors: Michito Ishii, Kanagawa (JP); Junichi Nakamura, Chiba (JP); Shuichi Ootsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 10/106,586

(22) Filed: Mar. 25, 2002

(65) Prior Publication Data

US 2002/0103670 A1 Aug. 1, 2002

Related U.S. Application Data

(62) Division of application No. 09/247,910, filed on Feb. 11, 1999.

(30) Foreign Application Priority Data

Feb. 23, 1998 (JP) .............................. P10-040729
Jul. 3, 1998 (JP) .............................. P10-189271

(51) Int. Cl.
*G06F 17/60* (2006.01)

(52) U.S. Cl. ........................... 705/52; 705/16; 705/30; 705/51; 705/57; 463/25; 463/29; 463/40; 463/41; 463/42; 463/43; 434/307 A; 434/307 R

(58) Field of Classification Search .................. 705/51, 705/52, 57, 16, 30; 463/25, 29, 40–43; 434/307 A, 434/307 R
See application file for complete search history.

(56) References Cited

U.S. PATENT DOCUMENTS 5,153,917 A * 10/1992 Kato .......................... 713/200
5,489,103 A * 2/1996 Okamoto ..................... 463/29
5,587,546 A * 12/1996 Kato et al. ..................... 84/609
5,654,516 A * 8/1997 Tashiro et al. ................ 84/601
5,797,752 A * 8/1998 Umezawa ............... 434/307 A
5,824,934 A * 10/1998 Tsurumi et al. ............... 84/609
5,890,910 A * 4/1999 Tsurumi et al. ......... 434/307 A
5,953,005 A * 9/1999 Liu ......................... 715/500.1
5,980,261 A * 11/1999 Mino et al. ............. 434/307 A
6,074,215 A * 6/2000 Tsurumi ................. 434/307 A
6,231,347 B1 * 5/2001 Tsai ....................... 434/307 A
6,477,506 B1 * 11/2002 Ishii et al. .................... 705/16

FOREIGN PATENT DOCUMENTS

EP 0502246 A2 * 9/1992
EP 0509766 A2 * 10/1992
JP 08-305378 * 11/1996

(Continued)

OTHER PUBLICATIONS

Anonymous, "Japan's Information Superhighway", Industries In Transition, vol. 22, No. 9, Jan. 1995.*

(Continued)

*Primary Examiner*—James P. Trammell
*Assistant Examiner*—Bradley B. Bayat

(74) *Attorney, Agent, or Firm*—Jay H. Maioli

(57) ABSTRACT

A transmitting system is provided in which a data once downloaded in a memory means of a terminal apparatus from an information service center is returned to the information service center while the returned data is deleted from the memory means of the terminal apparatus, and a fee for a next new data purchased by the terminal apparatus from the information service center is discounted or not charged.

7 Claims, 5 Drawing Sheets

FOREIGN PATENT DOCUMENTS

| | | | | |
|---|---|---|---|---|
| JP | 08305378 | A | * | 11/1996 |
| WO | WO 96/12259 | A1 | * | 4/1996 |
| WO | WO 97/20297 | A1 | * | 6/1997 |
| WO | WO 98/58327 | A1 | * | 12/1998 |

OTHER PUBLICATIONS

Anonymous, "Satellite-Based Karaoke Broadcasting Service to Start", NTT Topics, Oct. 21, 1996.*

* cited by examiner

| DATA NAME | DOWNLOAD DATE | COPY HISTORY | No. OF PLAYS | · · · |
|---|---|---|---|---|
| FIRST SELECTION : ○○○ | 92. 5. 7 | 0 | 10 | |
| SECOND SELECTION : △△△ | 94. 8. 9 | 0 | 100 | |
| THIRD SELECTION : ××× | 96. 5. 10 | 1 | 40 | |
| ⋮ | ⋮ | ⋮ | ⋮ | |

FIG.4

| USER ID/NAME | NUMBER n OF DOWNLOADABLE DATA | . . . . . |
|---|---|---|
| ABC01234/○○○ | 2 | |
| BCD23456/△△△ | 0 | |
| XYZ98765/××× | 3 | |
| ⋮ | ⋮ | |

FIG.6

TERMINAL APPARATUS, INFORMATION SERVICE CENTER, TRANSMITTING SYSTEM, AND TRANSMITTING METHOD

This is a division of prior application Ser. No. 09/247,910 filed Feb. 11, 1999.

BACKGROUND OF THE INVENTION

1. Field of the Invention

The present invention relates to a terminal apparatus, information service center, transmitting system, and a transmitting method, in which a data is served from the information service center to the terminal apparatus where it is stored once and a useless or unnecessary data is deleted from the data stored in the terminal apparatus, an equivalent exchange rate or reimbursement rate is calculated for the deleted useless data, and when a new data is next purchased by the terminal apparatus from the information service center, the served next data is priced through calculation by discounting for the deleted useless data or charging nothing for the next served data based on the equivalent exchange rate.

2. Description of Related Art

Currently, the so-called Karaoke playing systems are very popular in which a user sings to the accompaniment of a favorite Karaoke music (background music)selected by him or her and reproduced by a Karaoke player. The Karaoke player is normally adapted such that a background music (Karaoke music) reproduced by the Karaoke player and a song sung by a user to the accompaniment of his selected background music and supplied to the player are mixed and provided as an output of the player. The currently available typical Karaoke systems include a stand-alone type system, prevailing extremely widely, in which an audio signal as a background music and a video signal providing a background scene suiting the music are reproduced and given from a recording medium such as optical disc or the like, and a communication Karaoke system in which a MIDI (musical instrument digital interface) data as background music transmitted from a server at an information service center, received and stored by a terminal apparatus, and a MIDI data for a selected background music is reproduced at the terminal apparatus.

Of the above Karaoke systems, the communication Karaoke system employed in the Karaoke stores is such that a contact is concluded between each Karaoke shop as user or subscriber of a Karaoke data serving system provided by a host station as information service center to distribute or serve to the Karaoke shop a Karaoke data requested by the Karaoke shop for service or over a public telephone line or similar at each such a request.

The aforementioned public telephone lines may include those using ISDN (integrated services digital network or modem and those using a communications satellite.

In the communication Karaoke system, when a new music, for example, is released, the host station has to prepare a Karaoke data composed of a MIDI data for the released new music for supply over the public telephone line to each Karaoke shop. The currently available communication Karaoke system can serve a Karaoke data of a newly released music very soon after the release to a high satisfaction of the users or subscribers of the Karaoke system.

In the above-mentioned prevailing stand-alone type Karaoke system, however, a service of a background music (Karaoke music) is completed when the music is supplied to a user having requested it, and cannot be moved in the time and space domains. Also, in a Karaoke system such as Internet Karaoke system using a transmitting system, when a user or subscriber of the system having downloaded a background or Karaoke music data from the Internet Karaoke system does not want to enjoy it any more, he or she cannot return the downloaded music data to the information service center.

In the above-mentioned conventional music service system, when the user does not want to enjoy such a downloaded music data which has become a hackneyed one to him, the music data will be just a rubbish to him but he can only erase it. In such a case, he will think that the money he paid for the music data is not small to him.

In the second-hand music record disc market, the used record discs are sold and bought. This market system cannot have successfully been applied to the music data service system based on the above-mentioned communications means. There have been many difficulties for this application. More particularly, the conventional music data service system incurs a troublesome allotment of a service fee since it is not free from the problem of copyright, and a problem of security is involved in the money transfer over the data transfer system.

SUMMARY OF THE INVENTION

Accordingly, the present invention has an object to overcome the above-mentioned drawbacks of the prior art by providing an information service center and a transmitting system, in which a data cen be served to each terminal apparatus, namely, each user, at a low price because the data may be returned to a data server and with a high security because no troublesome money transfer is done.

The above object can be attained by providing terminal apparatus which receives a data served from an information service center and stores the received data, comprising:

a receiving means for receiving a data served from the information service center;

a first memory means for storing the data received by the receiving means;

an operation means operable to direct the terminal apparatus to return a useless one of the data stored in the first memory means to the information service center; and a second memory means for storing an information of reproducing frequency of each of individual data stored in the first memory means;

when the useless data is deleted from the data stored in the first memory means, a new data served and downloaded subsequently being priced through calculation by subtracting for the deleted useless data or charging nothing for the new downloaded data.

The above object can also be attained by providing an information service center which accumulates a plurality of data and serves to a terminal apparatus a data requested from the terminal apparatus, comprising:

an authenticating means for authenticating the terminal apparatus connected to the information service center;

a receiving means for receiving an information transmitted from the terminal apparatus authenticated by the authenticating means and which is related to the return of a useless data in the terminal apparatus;

a calculation means for calculating an equivalent exchange rate from the information received by the receiving means; and an accounting means for accounting a new data purchased subsequently by the terminal apparatus from the information service center by discounting for the returned useless data or charging nothing for the next purchased data based on the equivalent exchange rate.

The above object can also be attained by providing an information service center which accumulates a plurality of data and serves to a terminal apparatus a data requested from the terminal apparatus, comprising:

an authenticating means for authenticating the terminal apparatus connected to the information service center;

a receiving means for receiving an information transmitted from the terminal apparatus authenticated by the authenticating means and which is related to the return of a useless data in the terminal apparatus; and an accounting means for accounting a new data purchased subsequently by the terminal apparatus from the information service center by discounting for the returned useless data or charging nothing for the next purchased data based on an equivalent exchange rate calculated from the information received by the receiving means and related to the return of the useless data in the terminal apparatus.

The above object can also be attained by providing a transmitting system having a data server and at least one of terminal apparatuses, the terminal apparatus comprising:

a receiving means for receiving a data served from the information service center;

a first memory means for storing the data received by the receiving means;

an operation means operable to direct the terminal apparatus to return a useless one of the data stored in the first memory means to the information service center;

a second memory means for storing an information of reproducing frequency of each of individual data stored in the first memory means; and a transmitting means for transmitting an information on the return of the useless one of the data stored in the first memory means, that the operation means has been used to return to the information service center; and the data server comprising:

an authenticating means for authenticating the terminal apparatus connected to the information service center;

a receiving means for receiving an information transmitted from the terminal apparatus authenticated by the authenticating means and which is related to the return of a useless data in the terminal apparatus; and an accounting means for accounting a new data purchased subsequently by the terminal apparatus from the information service center by discounting for the returned useless data or charging nothing for the next purchased data based on an equivalent exchange rate calculated from the information received by the receiving means and related to the return of the useless data in the terminal apparatus.

The above object can also been attained by providing a transmitting system having a data server and at least one of terminal apparatuses, the terminal apparatus comprising:

a receiving means for receiving a data served from the information service center;

a first memory means for storing the data received by the receiving means;

an operation means operable to direct the terminal apparatus to return a useless one of the data stored in the first memory means to the information service center;

a second memory means for storing an information of reproducing frequency of each of individual data stored in the first memory means;

a calculation means for calculating an equivalent exchange rate based on the useless data stored in the first memory means and which has been returned to the information service center from the terminal apparatus directed to do so by means of the operation means; and a transmitting means for transmitting the equivalent exchange rate calculated by the calculation means to the information service center; and the data server comprising:

an authenticating means for authenticating the terminal apparatus connected to the information service center;

a receiving means for receiving an equivalent exchange rate for the useless data stored in the terminal apparatus authenticated by the authenticating means and which is transmitted from the terminal apparatus; and an accounting means for accounting a new data purchased subsequently by the terminal apparatus from the information service center through calculation by discounting for the returned useless data or charging nothing for the next purchased data based on the equivalent exchange rate received by the receiving means.

The above object can also be attained by providing a transmitting method of storing in a terminal apparatus once a data served from an information service center, and returning a useless one of the data stored in the terminal apparatus to the information service center, comprising the steps of:

designating the useless data in a memory means in the terminal apparatus;

deleting the designated data;

calculating an equivalent exchange rate for the deleted useless data; and discounting for the deleted useless data or charging nothing for the next new served data based on the calculated equivalent exchange rate.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 4 is a table listing additional information formed in a memory means included in the terminal apparatus according to the present invention when downloading data to the terminal apparatus;

FIG. 6 is a table listing accounting information cumulated at the information service center according to the present invention.

DETAILED DESCRIPTION OF THE PREFERRED EMBODIMENTS

Figure 1:
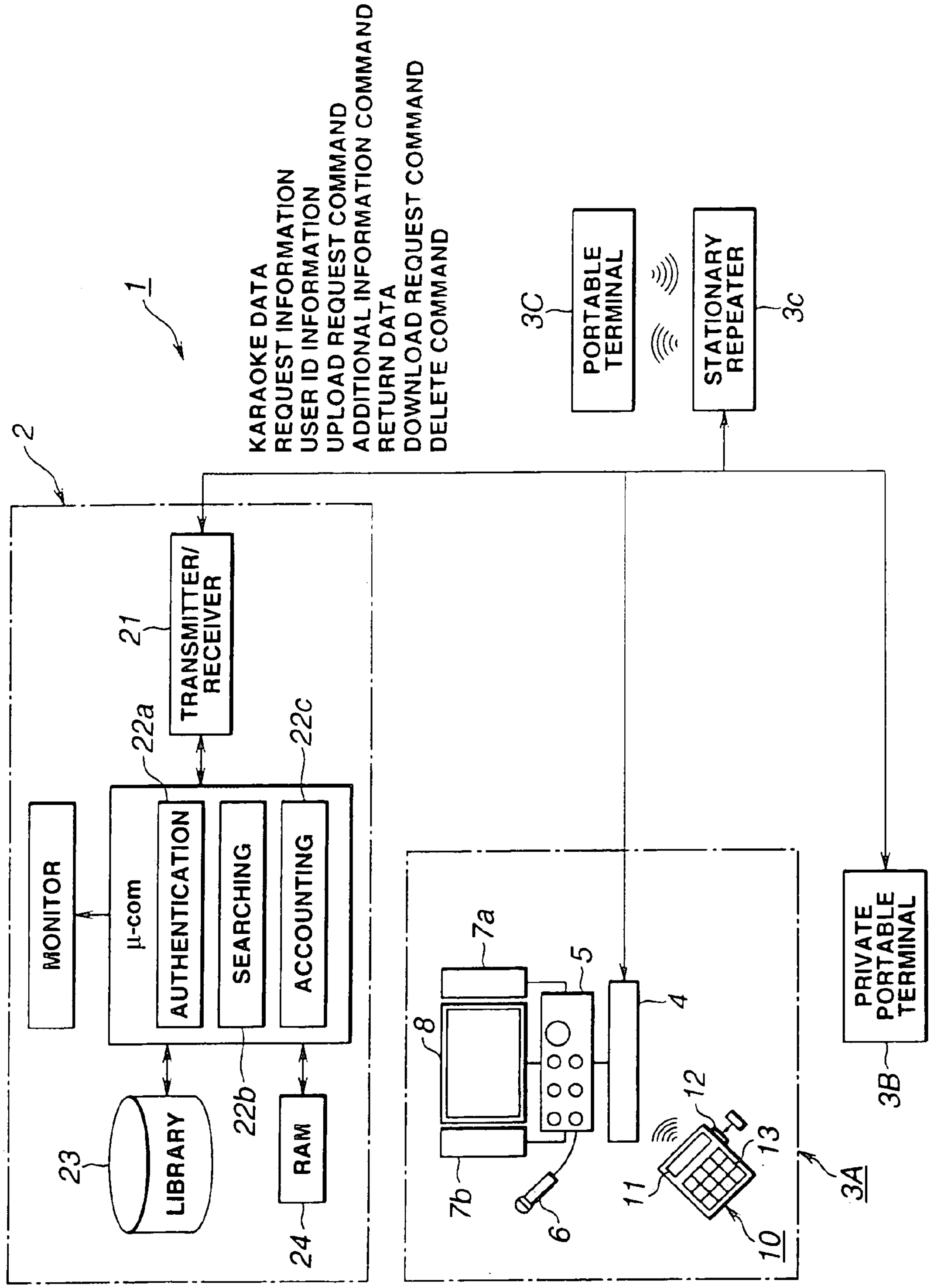
FIG. 1 is a block diagram of a transmitting system according to the present invention.

Referring now to FIG. 1, there is shown in the form of a schematic block diagram, a transmitting system, by way of example, of the present invention applied to a communication Karaoke system generally indicated with a reference 1.

As shown in FIG. 1, the communication Karaoke system 1 comprises an information service center 2 as host, and a plurality of terminal apparatuses 3A, 3B, 3C, . . . which are to be served by, or users or subscribers of, the information service center 2, the information service center 2 and terminal apparatuses 3 being connected to each other by means of a signal transmission path such as public telephone line.

The information service center incorporates a hard disc array 23 in which a library of Karaoke data consisting of MIDI (musical instrument digital interface) data. The information service center 2 receives a request information, user ID information, etc. transmitted from each of the terminal apparatuses 3A, 3B, 3C, . . . , serves a requested Karaoke data to each of the requesting terminal 3A, 3B, 3C, . . . , and accounts the served Karaoke data in a predetermined manner of calculation.

The terminal apparatuses 3A, 3B, 3C, . . . may include a stationary type terminal apparatus, a private portable terminal apparatus and a portable terminal apparatus provided on a stationary type repeater, for example, which are installed in home, Karaoke shop or similar.

Figure 2:
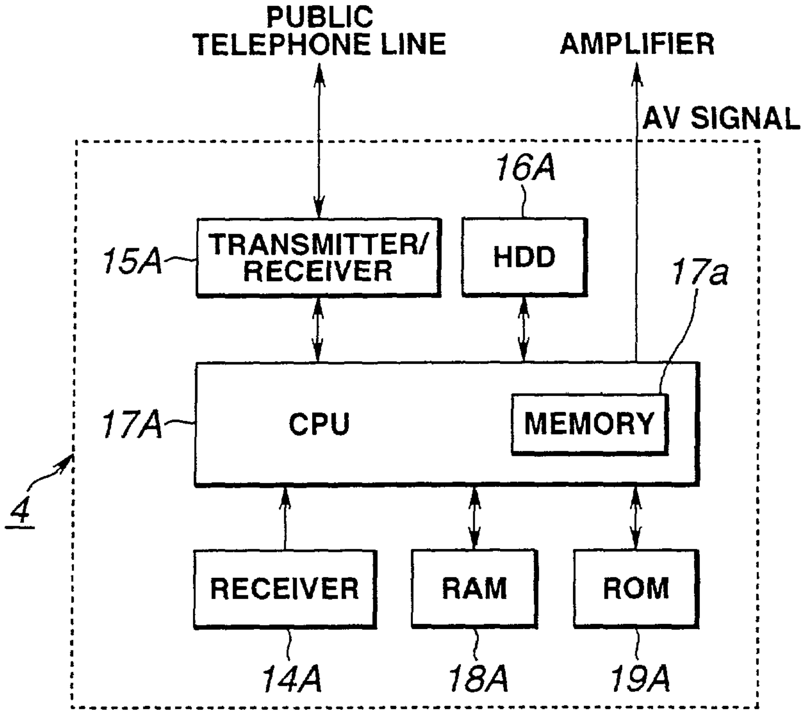
FIG. 2 is an internal block diagram of a stationary terminal apparatus included in the transmitting system in FIG. 1.

For instance, the terminal apparatus 3A is a stationary type comprising a main unit 4, amplifier 5 connected to the main unit 4, microphone 6, speakers 7*a* and 7*b* and monitor 8 connected to the amplifier 5, and a remote controller 10 which controls the main unit 4. The main unit 4 has a hard disc drive (HDD) 16A as shown in FIG. 2. Karaoke data supplied from the information service center 2 or other terminal apparatuses 3B, 3C, . . . is stored into the HDD 16A and reproduced as audio and video signals upon request from users. The amplifier 5 provides the audio and video signals from the main unit 4 to the monitor 8. The amplifier 5 also mixes a user's song supplied from the microphone 6 with the audio signal of the audio and video signals supplied from the main unit 4, additionally processes it with echo or other, and delivers it at the speakers 7*a* and 7*b*.

The remote controller 10 is adapted to control the operation of the main unit 4 of the terminal apparatus 3A and preserve and transmit a music identifying information such as the title of a music the user desires to sing, No. for a corresponding Karaoke data, the name of a music to be erased from the HDD 16A of the main unit 4, etc.

The remote controller 10 has an LCD (liquid crystal display) 11, JOG dial 12, a variety of control keys 13, and in addition, a control unit, memory, transmitter, etc. (not shown). By operating the JOG dial 12 and control keys 13 to select and enter alphanumerics, kana characters, etc., the title of a requested music, etc. are entered and stored into the memory beforehand, thereby preserving the music identifying information. By pressing the send key, for example, among the control keys 13 of the remote controller 10, the preserved information is transmitted by an infrared rays from the transmitter to the main unit 4 of the terminal apparatus 3A. Also when deleting a selected Karaoke data from the HDD 16A of the main uni 4, an information identifying a corresponding music is preserved by the similar operation to the above and transmitted to the main unit 4 by pressing the delete key, for example, among the control keys.

FIG. 2 is an internal block diagram of the stationary terminal apparatus 3A included in the communication Karaoke system in FIG. 1. As seen, the main unit 4 comprises a receiver 14A to receive a signal transmitted from the remote controller 10, receiver/transmitter 15A including a model for signal transmission and reception between the main unit 4 and information service center 2 or other terminal apparatuses 3B, 3C, . . . via a signal transmission path, the HDD 16A having been referred to in the foregoing to store Karaoke data transmitted from the information service center 2 or other terminal apparatuses 3B, 3C, . . . and user ID information on the user of the main unit 4, central processing unit (CPU) to run a processing program, RAM 18A being a work area of the CPU 17A, and a ROM 19A to store the processing program for the CPU 17A and management information for the HDD 16A. The CPU 17A further incorporates a memory 17*a*.

Figure 3:
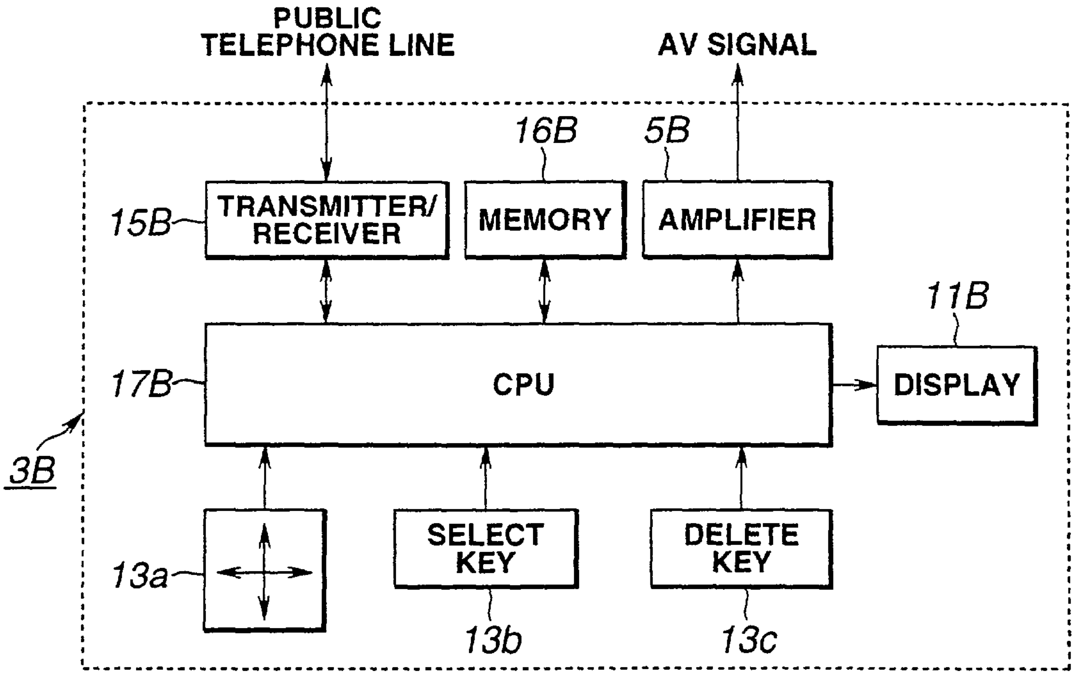
FIG. 3 is an internal block diagram of a private portable terminal apparatus included in the transmitting system according to the present invention in FIG. 1.

FIG. 3 is an internal block diagram of the private portable terminal apparatus 3B included in the communication Karaoke system 1 according to the present invention in FIG. 1. The private portable terminal apparatus 3B is of a compact design incorporating the functions of the main unit 4 and amplifier 5 of the stationary type terminal apparatus 3A. As shown, the terminal apparatus 3B comprises a transmitter/receiver 15B for signal transmission and reception between the terminal apparatus 3B and information service center 2 or other terminal apparatuses 3B, 3C, . . . via a signal transmission path, memory 16B to store Karaoke data, ID information, etc., CPU 17B to run a processing program, a variety of control keys connected to the CPU 17B such as select key 13*a*, music select key 13*b*, delete key 13*c*, etc., display 11B and an amplifier 5B.

The terminal apparatus 3C is a small portable terminal apparatus connected by infrared rays to a stationary type repeater 3*c* having the function of a transmitter/receiver with which a signal is transferred between the terminal apparatus 3C and information service center 2 or other terminal apparatuses 3A, 3B, . . . via a signal transmission path. In this terminal apparatus 3C, the transmitter/receiver 15B of the private portable terminal apparatus 3B is one using infrared rays.

The CPU 17A in the main unit 4 of the stationary type terminal apparatus 3A invokes the processing program from the ROM 19A and runs it to process as follows. When the receiver 14A receives a request information corresponding to a requested music transmitted from the remote controller 10, the CPU 17A reads out the user ID information from the HDD 16A and controls the transmitter/receiver 15A to send the request information and user ID information to the information service center 2. When the CPU 17A receives through the transmitter/receiver 15A a Karaoke data from the information service center 2, it supplies the Karaoke data to the HDD 16A where it is stored. Thus, the Karaoke data has purchased by the terminal apparatus 3A from the information service center 2.

Before downloading the Karaoke data in this way, the CPU 17A controls the RAM 18A to generate an additional information list, as shown in FIG. 4, for recording an additional information of the Karaoke data and the memory 17*a* to store the additional information list. As seen from FIG. 4, the additional information list is a record of the name of a downloaded Karaoke data, download date on which a Karaoke data has been downloaded, copy history showing whether or not a downloaded Karaoke data has been copied into any other recording medium, information of reproducing frequency showing how many times a downloaded Karaoke data has been reproduced, etc. The CPU 17A updates this additional information list each time a Karaoke data is downloaded, copied, reproduced, deleted or otherwise handled.

Also, the CPU 17A decodes and A/D converts a Karaoke data stored in the HDD 16A to produce audio and video signals for supply to the amplifier 5.

Furthermore, the CPU 17A follows a given procedure to assign the Karaoke data stored in the HDD 16A to any other terminal apparatuses 3B, 3C, . . . and return it to the information service center 2, and deletes the Karaoke data. This procedure will further be discussed later.

The CPUs provided in the other terminal apparatuses 3B, 3C, . . . have the similar functions to those of the CPU 17A.

The system control over Karaoke data service or other in the communication Karaoke system 1 is done at the information service center 2. The information service center 2 comprises a transmitter/receiver 21 to transmit and receive a signal to and from each terminal apparatus, a microcomputer (will be referred to as "μ-com" hereinunder) including an authentication circuit 22*a*, searching circuit 22*b* and accounting circuit 22*c*, a hard disc array 23 to cumulate Karaoke data, a RAM 24 being a work area of the μ-com 22, and a monitor 25 to provide the result of processing by the μ-com 22.

In the information service center 2, a request information and user ID information from each of the terminal apparatuses 3A, 3B, 3C, . . . is received by the transmitter/receiver 21 via a public telephone line, for instance. The user ID information is stored into the authentication circuit 22*a* in the μ-com 22, and the request information is stored into the searching circuit 22*b* of the μ-com 22. The authentication circuit 22*a* of the μ-com 22 authenticates whether the user ID information is a valid user ID. Only when the authentication circuit 22*a* authenticates that the user ID information is the valid one, the searching circuit 22*b* will operate. The searching circuit 22*b* retrieves and invokes a Karaoke data corresponding to the request information from the hard disc array 23. The μ-com 22 controls the transmitter/receiver 21 to transmit the invoked Karaoke data to a requesting terminal apparatus 3A, 3B, 3C or . . . via the public telephone line. Further, the μ-com 22 identifies a charged money collector based on the user ID information and controls the accounting circuit 22*c* to account the served Karaoke data in a predetermined manner of calculation.

In this communication Karaoke system 1, a Karaoke data downloaded at each of the terminal apparatuses 3A, 3B, 3C, . . . may be duplicated or copied or moved between the terminal apparatuses 3A, 3B, 3C, . . . as will be discussed below.

A Karaoke data which has not been copied so far may be duplicated between the terminal apparatuses 3A, 3B, 3C, . . . For instance, it can be copied from the terminal apparatus 3A to the terminal apparatus 3B. In this case, the CPU 17A in the main unit 4 of the terminal apparatus 3A as data source transfers the Karaoke data along with an additional information in which "1" is written in the copy history to the terminal apparatus 3B as data destination. In the terminal apparatus 3B, the Karaoke data and additional information transferred from the terminal apparatus 3A are stored into the memory 16B where the Karaoke data is duplicated. The duplicated or copied Karaoke data in the memory 16B of the terminal apparatus 3B cannot further be duplicated to any other terminal apparatus since the copy history has been changed to "1".

Also, Karaoke data may be moved between the terminal apparatuses 3A, 3B, 3C, . . . When it is moved from the terminal apparatus 3A to the terminal apparatus 3B, for instance, the CPU 17A of the main unit 4 of the terminal apparatus 3A as data source transfers the Karaoke data along with an additional information to the terminal apparatus 3B as data destination without changing the copy history. When the terminal apparatus 3B has successfully received and stored the transferred Karaoke data and additional information into the memory 16B, it will send a command for deletion of the Karaoke data to the terminal apparatus 3A. Thus, the moved Karaoke data from the terminal apparatus 3A is deleted from the HDD 16A.

Furthermore, in this communication Karaoke system 1, when the user of each of the terminal apparatuses 3A, 3B, 3C, . . . does not need any longer a Karaoke data downloaded to the terminal apparatus, the Karaoke data may be returned to the information service center 2.

Figure 5:
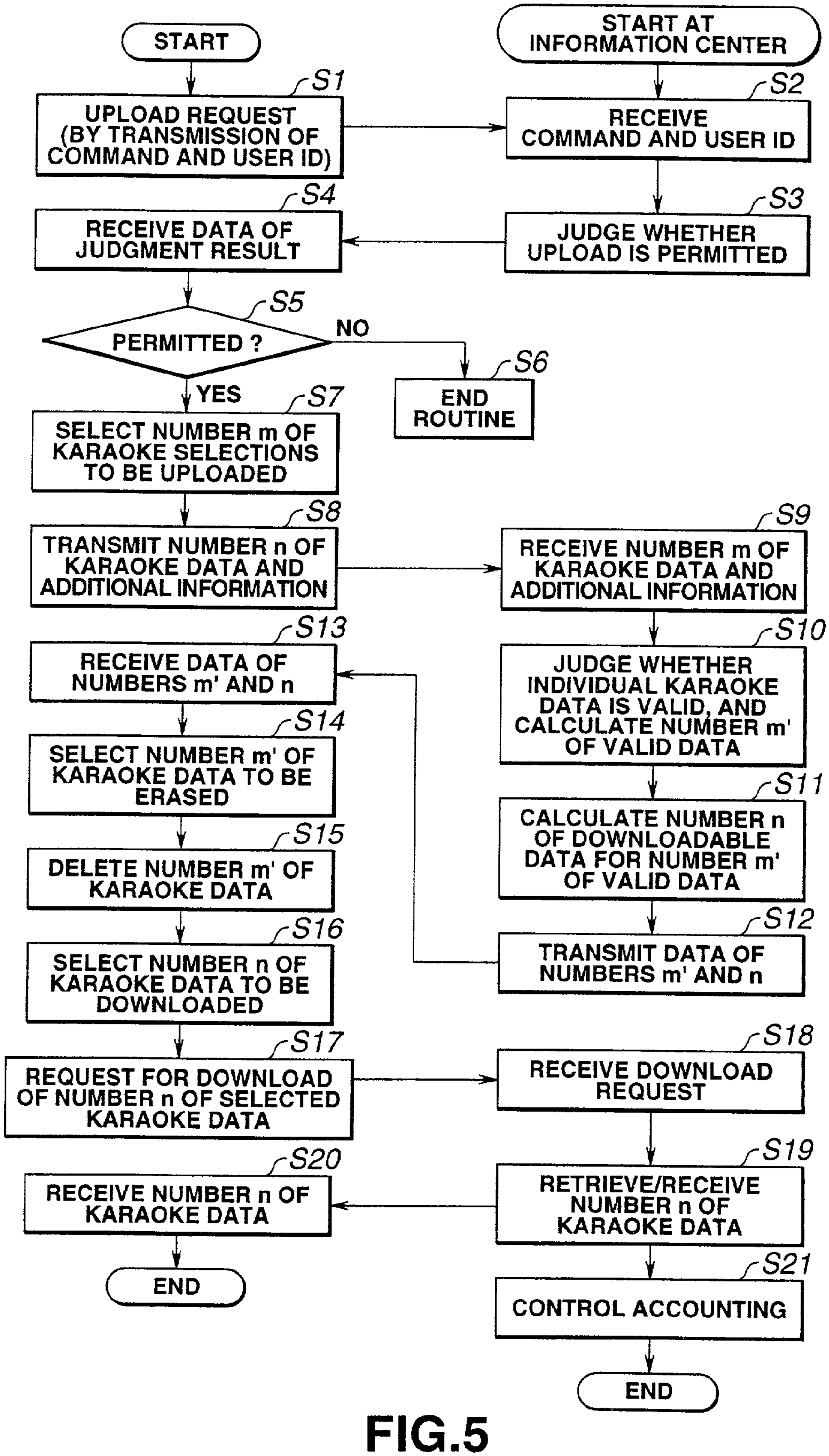
FIG. 5 is a flow chart of operations effected at the terminal apparatus and information service center according to the present invention at the time of data downloading to the information service center.

A useless Karaoke data downloaded in the HDD 16A of the terminal apparatus 3A, for example, and which is not necessary any more is returned to the information service center 2 as will be described with reference to FIG. 5. FIG. 5 is a flow chart of operations effected at the terminal apparatus and information service center at the time of data uploading to the information service center.

At step S1, the CPU 17A of the main unit 4 runs an upload request program to transmit an upload request command and user ID information from the transmitter/receiver 15A of the main unit 4 to the information service center 2. Thus, the terminal apparatus 3A has shown a will of returning a data to the information service center 2. The operation goes to step S1.

At step S2, the transmitter/receiver 21 of the information service center 2 receives the upload request command and user ID information. Then, the operation goes to step S3. At this step S3, the authentication circuit 22*a* of the μ-com 22 authenticates the user ID information to judge whether the uploading is allowed or not. The authentication circuit 22*a* sends a data of the authentication result to the terminal apparatus 3A. The operation goes to step S4.

At step S4, the transmitter/receiver 15A of the main unit 4 of the terminal apparatus 3A receives the data of the authentication result from the information service center 2. At next step S5, the CPU 17A judges whether the uploading has been allowed or not. The result of judgment is provided via the amplifier 5 to the monitor 8 where it is displayed. When it is judged that the uploading has not been allowed, the operation proceeds to step S6 where a termination routine is effected. If the judgment is that the uploading has been allowed the operation goes to step S7.

At step S7, a Karaoke data for return to the information service center 2 is selected at the terminal apparatus 3A. More particularly, the user operates the remote controller 10 while watching the screen of the monitor 8 to select a number m of Karaoke data to be uploaded to the information service center 2. The number m of Karaoke data will be read from the HDD 16A.

At next step S8, the CPU 17A of the main unit 4 controls the HDD 16A and transmitter/receiver 15A to send the selected number m of Karaoke data along with their additional information list to the information service center 2 via the public telephone line. The number m of Karaoke data and additional information list sent from the terminal apparatus 3A are received by the transmitter/receiver 21 of the information service center 2 and stored into the RAM 24, for example, at next step S9. Then the operation proceeds to step S10.

At step S10, the μ-com 22 of the information service center 2 judges whether every Karaoke data has been modified to know whether the data is valid or not. When the Karaoke data is judged to be valid, the $\mu$-com 22 will calculate a number m' of valid data with reference to the copy history in the additional information list as shown in FIG. 4, for example. When the copy history is "0", it is judged that the data is valid. On the contrary, when the copy history shows "1", the judgment will be such that the data is invalid. Note that an authentication system using an electronic watermark may be used to judge the data validity by ascertaining whether the Karaoke data is a one having once been served or copied.

If all the Karaoke data are found to be ones having fraudulently or illegally been copied, no reimbursement rate will be calculated.

At next step S11, the $\mu$-com 22 will calculate the number m' of valid Karaoke data to determine a number n of downloadable Karaoke data with reference to the download date and No. of plays in the additional information list in such a manner that the number n will be smaller for a Karaoke data whose download date, for example, is old while it will be larger for a Karaoke data whose No. of plays is small. Note that the number n may be calculated with reference to either the download date or No. of plays alone. This manner of calculation will improve the availability of the communication Karaoke system by preventing any useless Karaoke data from remaining long not reproduced in the HDD 16A of the main unit 4.

The present invention can provide a unique communication Karaoke system which is adapted to determine the number n with reference to either the download date or No. of plays alone, to thereby price a Karaoke data once purchased by the terminal apparatus from the information service center and which is to be returned from the terminal apparatus to the information service center, based on its No. of plays and period of use as in the ordinary trade-in of used compact discs.

At this time, the $\mu$-com 22 will generate an accounting information list including at least a user ID and number n of downloadable data as shown in FIG. 6. The accounting information list is stored into the RAM 24. When an accounting information list has already been prepared for a user in consideration, the number n included in the accounting information list may only be added to the number m' of valid data and additional information list in the calculation of a number n of downloadable data at step S11. The number n may be a decimal one like 0.4, 0.5 or 1.2 as well as a natural number like 1, 2 or 3.

At next step S12, the $\mu$-com 22 controls the transmitter receiver 21 to send data of the calculated numbers m' and n to the terminal apparatus 3A. Thereby, the information service center 2 of the communication Karaoke system 1 shows a will to admit a so-called equivalent exchange between the number m' of valid data and number n of downloadable data.

At step S13, when the transmitter/receiver 15A of the main unit 4 of the terminal apparatus 3A receives the data of the number m' of valid data and number n of downloadable data, the CPU 17A will provide the number m' of valid data and number n of downloadable data to the monitor 8 via the amplifier 5. At next step S14, a number m' of valid data to be deleted is selected from the selected number m of data. By operating the remote controller 10 while watching the screen of the monitor 8, the number m' of Karaoke data to finally be deleted is selected.

At next step S15, the CPU 17A of the main unit 4 will delete the number m' of Karaoke data from the HDD 16A. Thus, the Karaoke data stored in the HDD 16A will apparently be returned to the information service center 2 in the communication Karaoke system 1. Note that at the main unit 4 of the terminal apparatus, the additional information list in the memory 17*a* will be rewritten by the CPU 17A.

At further step S16, the main unit 4 selects a number n of Karaoke data for downloading by entering for example a music name and ID No. for the music name using the remote controller 10. At next step S17, the CPU 17A of the main unit 4 will control the transmitter/receiver 15A to send a download request command for the selected number n of Karaoke data to the information service center 2.

At the information service center 2, when the transmitter/receiver 21 receives the download request for the number n of Karaoke data at next step S18, the $\mu$-com 22 will search the number n of Karaoke data from the hard disc array 23 and send it to the terminal apparatus 3A at next step S19. The sent number n of Karaoke data is received by the terminal apparatus 3A at step S20.

At step S21, the u-com 22 of the information service center 2 will control the accounting circuit 22*c* to account the Karaoke data supplied to the terminal apparatus 3A in a predetermined manner of calculation with reference to the aforementioned accounting information list. Normally, no accounting and money collection will be done in practice based the above-mentioned equivalent exchange. However, when it is designated at step S16 to download, for example, a larger number of Karaoke data than the number n, the excess of Karaoke data above the number n may be accounted. Also, when it is designated at step S16 to download one Karaoke data per the number n equal to n=0.5, for example, a price being a half of the regular one may be charged and collected.

Further, if it is designated at step S16 to download a smaller number of Karaoke data than the number n, the downloaded Karaoke data is accounted with reference to the aforementioned accounting information list when requesting a next data downloading. That is, a number of downloadable Karaoke data having previously been requested but not yet downloaded by a next time of download request is stocked at the information service center 2 so that a money charged at the next downloading will be low.

Upon completion of the accounting, the $\mu$-com 22 of the information service center 2 will rewrite the value n in the accounting information list as necessary and terminates the data returning operation.

As having been described in the foregoing, the communication Karaoke system 1 is adapted to apparently return a useless Karaoke data from the terminal apparatus to the information service center 2 and pay for the returned useless Karaoke data with another Karaoke data on the equivalent exchange basis. Thus, the user can enjoy an inexpensive Karaoke data service. Further, the accounting circuit 22*c* can be controlled to provide a simple and highly safe reimbursement without any troublesome money transfer in which a third part may possibly intervene.

In the aforementioned communication Karaoke system 1, the equivalent exchange rate is varied based on the information of reproducing frequency at the terminal apparatus, so the present invention can provide a unique system which can price a Karaoke data once purchased by the terminal apparatus from the information service center and which is to be returned from the terminal apparatus to the information service center, based on its No. of plays as in the ordinary trade-in of used compact discs.

Furthermore, the above-mentioned communication Karaoke system 1 is adapted to vary the equivalent exchange rate based on the data on which a Karaoke data has been downloaded at the terminal apparatus. Therefore, the present invention can provide a unique system which can price a Karaoke data once purchased by the terminal apparatus from the information service center and which is to be returned from the terminal apparatus to the information service center, based on its period of use as in the ordinary tradein of used compact disks.

In the foregoing, the present invention has been described concerning the embodiments in which a karaoke data to be uploaded from each of the terminal apparatus 3A, 3B, 3C, . . . to the information service center 2 is first downloaded from the information service center 2 to each of the terminal apparatuses 3A, 3B, 3C, . . . . However, the present invention is not limited to these embodiments. The communication Karaoke system 1 may be adapted such that for example, a Karaoke data a user has prepared himself may be uploaded from the terminal apparatus 3A to the information service center 2.

Also, in the communication Karaoke system 1 having been described in the foregoing, the equivalent exchange rate is calculated at the information service center 2 for a useless Karaoke data based on its No. of plays at the terminal apparatus 3A. However, the equivalent exchange rate may be calculated at the terminal apparatus 3A for a useless Karaoke data based on its period of use at the terminal apparatus 3A and sent to the information service center 2.

Similar operations to those effected at the information service center 2 at steps S9 and S11 as shown in FIG. 5 may be done by the CPU at the terminal apparatus 3A. In this case, only an equivalent exchange rate calculated for a Karaoke data to be deleted has to be sent from the terminal apparatus to the information service center.

Also, in the communication Karaoke system 1 having been described in the foregoing, the equivalent exchange rate is calculated at the information service center 2 for a useless Karaoke data based on its No. of plays at the terminal apparatus 3A. However, the equivalent exchange rate may be calculated based on a sold amount of a Karaoke data returned from the terminal apparatus. A returned popular Karaoke data which sells much may be accounted at a high rate, while a returned Karaoke data which sells a little may be accounted at a low rate.

In this case, the information to be sent from the terminal apparatus to the information service center may only be a data name corresponding to a Karaoke music to be deleted, and the information service center may determine an equivalent exchange rate based on a sold amount of the Karaoke data returned from the terminal apparatus.

Thus, the present invention can provide a unique system which can price a Karaoke data once purchased by the terminal apparatus from the information service center and which is to be returned from the terminal apparatus to the information service center, based on its market acceptance as in the ordinary trade-in of used compact discs.

In the foregoing, the present invention has been described concerning a communication Karaoke system in which MIDI data for Karaoke data is transmitted. However, the present invention is not limited to this MIDI data transmission but can be applied to a general data service system for audio and video signals as well as for compressed data such ATRAC (adaptive transform acoustic coding) data, program data such as game software, text data, etc. For downloading of a text data in an electronic data service or distribution system for newspaper, magazines, novels, etc., the trade-in service as in the present invention can be adopted to provide an inexpensive service to users or subscribers of the system.

As having been described in the foregoing, in the transmitting system according to the present invention, the selecting means in the information service center controls the accounting means according to a Karaoke information for a useless or unwanted music, which is transmitted from the terminal apparatus to the information service center, so that the user can have an opportunity of returning the data to the information service center. Thus, data can be served to users at reasonable costs. Also, since the accounting means is controlled for an equivalent exchange between a deleted data and a newly served data, so that a safe reimbursement is possible which is free from troublesome money transfer and intervention of any third party.

What is claimed is:

1. A system that transfers data between an information service center and a plurality of terminals, comprising:

first and second terminals, each including receiving means for receiving data served from the information service center;

first memory means for storing the data received by the receiving means;

operation means operable to direct the terminal apparatus to delete and transfer unnecessary data of the data stored in the first memory means to the information service center;

second memory means for storing information of a reproduction frequency of each individual data stored in the first memory means; and transmitting means for transmitting to the information service center the unnecessary data and for transmitting the information of the reproduction frequency of the unnecessary data deleted from the first memory means and transmitted to the information service center, wherein the information service center calculates an equivalent exchange rate based on the information transmitted by the transmitting means, and discounts for a subsequent new served data based on the calculated equivalent exchange rate.

2. The system that transfers data as set forth in claim 1, wherein the receiving means receives the data from the information service center over a public telephone line.

3. The system that transfers data as set forth in claim 1, wherein at least one of the first and second terminals comprises a private portable terminal apparatus.

4. The system that transfers data as set forth in claim 1, further comprising an accounting circuit in the information service center for charging a fee to a user of one of the first and second terminal upon transferring data thereto.

5. The system that transfers data set forth in claim 1, wherein at least one of the first and second terminals communicates with the information service center by wireless communication.

6. The system that transfers data as set forth in claim 1, further comprising an authentication circuit in the information service center for authenticating that a user of one of the first and second terminals is a valid user.

7. The system that transfers data as set forth in claim 1, further comprising means for copying data from the first terminal to the second terminal.

* * * * *